(12) United States Patent
Chang et al.

(10) Patent No.: US 8,791,923 B2
(45) Date of Patent: Jul. 29, 2014

(54) TOUCHING DEVICE, LASER SOURCE MODULE, AND LASER SOURCE STRUCTURE THEREOF

(75) Inventors: Heng-Yao Chang, Tao-Yuan (TW); Sheng-Pin Su, Tao-Yuan (TW)

(73) Assignee: TPK Touch Solutions Inc., Taipei (TW)

( * ) Notice: Subject to any disclaimer, the term of this patent is extended or adjusted under 35 U.S.C. 154(b) by 2 days.

(21) Appl. No.: 12/747,163

(22) PCT Filed: Jul. 10, 2009

(86) PCT No.: PCT/CN2009/000785
§ 371 (c)(1),
(2), (4) Date: Jun. 9, 2010

(87) PCT Pub. No.: WO2010/108304
PCT Pub. Date: Sep. 30, 2010

(65) Prior Publication Data
US 2012/0001871 A1 Jan. 5, 2012

(30) Foreign Application Priority Data
Mar. 27, 2009 (CN) .......................... 2009 2 00063946

(51) Int. Cl.
*G06F 3/042* (2006.01)
(52) U.S. Cl.
USPC .......................................... 345/175; 345/176
(58) Field of Classification Search
CPC .................................................... G06F 3/0421
USPC ................... 345/82, 156–184; 356/4.01, 71; 359/279, 618; 382/124
See application file for complete search history.

(56) References Cited

U.S. PATENT DOCUMENTS

| 557,881 | A | 11/1996 | Bidiville et al. |
| 5,995,224 | A * | 11/1999 | de Groot ...................... 356/511 |
| 6,333,735 | B1 | 12/2001 | Anvekar |
| 6,614,422 | B1 | 9/2003 | Rafii et al. |
| 7,084,857 | B2 * | 8/2006 | Lieberman et al. ........... 345/168 |
| 7,242,388 | B2 | 7/2007 | Lieberman et al. |
| 7,305,368 | B2 | 12/2007 | Lieberman et al. |

(Continued)

FOREIGN PATENT DOCUMENTS

| CN | 101086694 A | 12/2007 |
| CN | 101149479 A | 3/2008 |

(Continued)

OTHER PUBLICATIONS

German Search Report (G42237) dated Apr. 30, 2010.

*Primary Examiner* — Prabodh M Dharia
(74) *Attorney, Agent, or Firm* — Gokalp Bayramoglu

(57) ABSTRACT

The disclosure describes a touch device including a touching area having a first edge and a second edge; two reflective lens arrays and two laser source modules which are all disposed at the first edge and the second edge respectively, wherein each laser source module includes a laser diode and a diffractive optical element assembled in front of the laser diode for separating a laser beam projected from the laser diode to a plurality of laser beams with equal magnitude, the laser beams are distributed in a parallel arrangement over the touching area by the reflective lens array; and two receiving devices disposed at the corresponding edges of the first edge and the second edge respectively. The receiving device includes a plurality of sensing units, wherein each sensing unit receives one of the laser beams respectively.

5 Claims, 6 Drawing Sheets

(56) References Cited

U.S. PATENT DOCUMENTS

| | | | |
|---|---|---|---|
| 7,417,681 B2 | 8/2008 | Lieberman et al. | |
| 7,442,914 B2 * | 10/2008 | Eliasson et al. | 250/221 |
| 7,715,084 B2 * | 5/2010 | Tan et al. | 359/279 |
| 7,728,959 B2 * | 6/2010 | Waldman et al. | 356/71 |
| 7,746,559 B2 * | 6/2010 | Sharon et al. | 359/618 |
| 2001/0030642 A1 | 10/2001 | Sullivan et al. | |
| 2006/0018025 A1 * | 1/2006 | Sharon et al. | 359/618 |
| 2006/0251421 A1 * | 11/2006 | Arnon | 398/73 |
| 2007/0012777 A1 * | 1/2007 | Tsikos et al. | 235/454 |
| 2007/0097097 A1 | 5/2007 | Liao | |
| 2007/0222760 A1 | 9/2007 | Lieberman et al. | |
| 2008/0100820 A1 * | 5/2008 | Sesko | 356/4.01 |
| 2008/0123908 A1 * | 5/2008 | Waldman et al. | 382/124 |
| 2008/0198144 A1 * | 8/2008 | Shimizu et al. | 345/175 |
| 2009/0174683 A1 * | 7/2009 | Juni et al. | 345/173 |
| 2010/0238139 A1 * | 9/2010 | Goertz et al. | 345/175 |
| 2013/0141395 A1 * | 6/2013 | Holmgren et al. | 345/175 |

FOREIGN PATENT DOCUMENTS

| | | |
|---|---|---|
| CN | 201212989 Y | 3/2009 |
| CN | 201266363 Y | 7/2009 |
| JP | 2001166874 | 6/2001 |
| JP | 2006031623 | 2/2006 |
| JP | 2001514779 | 9/2011 |
| TW | 200705757 A | 2/2007 |
| TW | 200743013 A | 11/2007 |
| WO | WO2008138049 | 11/2008 |

* cited by examiner

TOUCHING DEVICE, LASER SOURCE MODULE, AND LASER SOURCE STRUCTURE THEREOF

CROSS-REFERENCE TO RELATED APPLICATIONS

This application claims the priority benefit of International Application No. PCT/CN2009/000785, filed on Jul. 10, 2009, the entire contents of which are hereby incorporated by reference.

BACKGROUND OF THE INVENTION

1. Field of the Invention

The present invention generally relates to a touch device, light source module, and a light source structure thereof, and more particularly, to a touch device, light source module, and a light source structure having a laser light source.

2. Description of Related Art

Conventional touching panels include different types of touching panels, such as a resistance type touching panel or a capacitance type touching panel. Wherein the touching panels mentioned above are operated by measuring the resistance variance or the capacitance variance for defining the touching position for performing an input process while an input medium, for example, the human body or a touching pen, touching the touching panel.

Because the touching panels mentioned above are made of a plurality of films, the visual effect of the display screen having a touching panel is influenced by the transparent properties of the films directly. The visual effect of the display screen is also influenced by the properties of color distortion, reflective properties, and definition. If any one of the properties mentioned above is not proper, the visual effect of the display screen would become poor. Besides, while performing an input process, an input medium, a finger or a touching pen must touch the touching panel mentioned above. In order to achieving a proper input result, it is necessary to touch the touching panel with a certain degree of pressure. It is easy to scratch the surface of the touching panel. Moreover, the resolution of the conventional touching panel is limited by the circuit lay out of the touching panel. Thus, the touching panels mentioned above are not suitable for a large-size touching panel having high resolution.

Conventional touching panels also include the optical type touching panel wherein the optical method is used to be a medium for detecting the touching position. The advantage of the optical type touching panel is that the visual effect of the display screen is not be influenced. The resolution of the optical type touching panel is defined by the density of the optical sensors and the resolutions of firmware and software.

Generally speaking, there are two methods for applying laser as the medium of detecting the touching position. The first method is using laser arrays, wherein each laser unit is corresponding to one laser detecting sensor. As the resolution of the optical type touching panel is increased, the number of the laser unit and laser detecting sensor is also increased. Accordingly, the manufacturing cost, energy consumption, and heat generated are also increased. That is not good for the realization of the product. The LED array can improve the disadvantages mentioned above. However, the LED light source is a divergent light source, and the laser light source is a coherent light source. Hence, when using the LED array as medium for detecting the touching position, it is only possible to achieve the effect of analog signals, not digital signals. There is also a method using a single laser source and a scanning mechanism which includes an oscillator or a rotating motor for achieving the purpose of scanning a detecting surface. The advantage of this method is low manufacturing cost. However, both the oscillator and the rotating motor will generate electromagnetic wave; the communicating quality of the original product may be interfered with the electromagnetic wave. Moreover, there is also a method which uses a single laser source and a beam-splitter mirror array. The energies of the laser beams projected from the beam-splitter mirror array are distributed unequally. As the number of mirror is increased, the energies of the laser beams projected from the beam-splitter mirror array are decayed quickly. Thus, it is difficult or impossible to detect all of the laser beams projected from the beam-splitter mirror array. In other words, realization value of this method is poor.

Moreover, as disclosed in U.S. Pat. Nos. 7,242,388, 7,305,368, 7,417,681, and 6614422, a specific pattern is projected to a detecting plane as a reference pattern for detecting the touching position. The imagines of the detecting plane are compared for defining the touching position. Because comparing the images is performed by analog signals, it is necessary to use a signal processor for performing the complicated analog calculation so as to define the touching position. Therefore, this method is not suitable for a touch device having high resolution or high response speed.

SUMMARY OF THE INVENTION

Accordingly, the present invention has been made in order to improve the disadvantages of the conventional touch devices, and embodiments of the present invention provide a novel touch device which is suitable for a large-size display screen. Higher resolution of the large-size display screen is achieved. The touch device is able to output digital signals; the touching position within the touching area can be defined directly without the conventional complicated analog calculation performed by the signal processor.

Accordingly, the present invention provides a touch device, a laser source module, and a laser source structure thereof. The touch device includes a touching area having a first edge and a second edge, the first edge is adjacent to the second edge; two reflective lens arrays and two laser source modules which are all disposed at the first edge and the second edge respectively, wherein each laser source module includes a laser diode and a diffractive optical element assembled in front of the laser diode for separating a laser beam projected from the laser diode to a plurality of laser beams with equal magnitude, the laser beams are distributed in a parallel arrangement over the touching area by the reflective lens array; and two receiving devices disposed at the corresponding edges of the first edge and the second edge respectively. The receiving device includes a plurality of sensing units, wherein each sensing unit receives one of the laser beams respectively, and each sensing unit outputs one digital signal.

DETAILED DESCRIPTION OF THE INVENTION

The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components.

Figure 1:
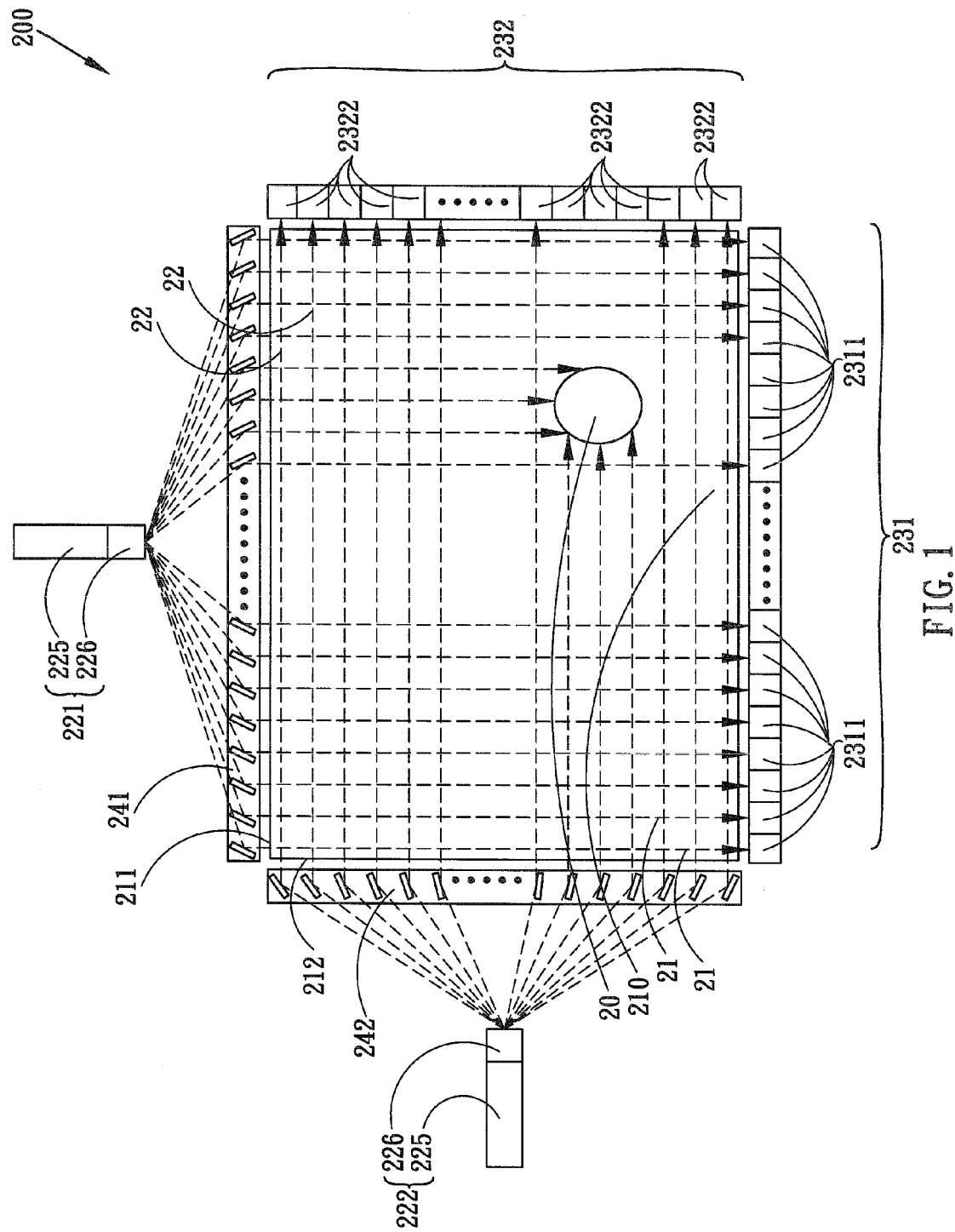
FIGS. 1 and 2 show a top view and a side view of a touch device in accordance with a preferred embodiment of the present invention respectively.
Figure 2:
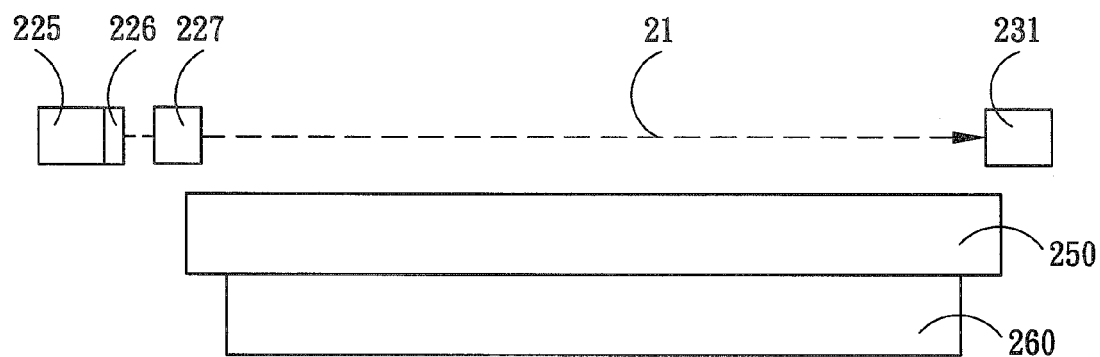

FIG. 1 and FIG. 2 show a top view and a side view of a touch device 200 in accordance with a preferred embodiment of the present invention. The touch device 200 can be disposed on a surface of a display screen 260. Or the touch device 200 can be disposed on a surface of a display screen 260 by an exclusive transparent glass 250. The touch device 200 includes a touching area 210, a first reflective lens array 241, a second reflective lens array 242, a first laser source module 221, a second laser source module 222, a first receiving device 231, and a second receiving device 232.

The touching area 210 includes a first edge 211 and a second edge 212, and the first edge 211 is adjacent to the second edge 212. The first reflective lens array 241 and the second reflective lens array 242 are disposed at the first edge 211 and the second edge 212 respectively. The first laser source module 221 and the second laser source module 222 are disposed at the first edge 211 and the second edge 212 respectively. For example, the first laser source module 221 and the second laser source module 222 can be located at the first edge 211 and the second edge 212 respectively, especially at center positions of the first edge 211 and the second edge 212 respectively. These laser source modules 221/222 are at a preset distance from the corresponding reflective lens arrays 241/242 respectively. The first receiving device 231 and the second receiving device 232 are disposed at the corresponding edges of the first edge 211 and the second edge 212 respectively. The first laser source module 221 and the second laser source module 222 project a plurality of laser beams 21/22 with equal magnitude respectively. The laser beams 21/22 are distributed in an interlaced arrangement over the touching area 210. For example, the laser beams 21/22 are arranged in a checkerboard arrangement. The first receiving device 231 and the second receiving device 232 receive laser beams 21/22 respectively.

The first receiving device 231 and the second receiving device 232 include a plurality of first sensing units 2311 and second sensing units 2312 respectively so as to sense energy variations in different positions. When the touch device 200 performing an input process, a part of the laser beams 21/22 is blocked by the input media, such as the human body or a touching pen, so as to make the first receiving device 231 and the second receiving device 232 to sense energy variations in different positions. The energy variations in different positions are outputted to a signal processor for calculating the touching position within the touching area 210. Besides, according to this embodiment, the first receiving device 231 and the second receiving device 232 are linear image sensors. However, the first receiving device 231 and the second receiving device 232 are not limited to linear image sensors, the first receiving device 231 and the second receiving device 232 can be other devices which have similar functions.

Because the laser beams 21/22 are coherent lights which are not divergent, each laser beam 21/22 can project to only one sensing unit 2311/2312 to form an on-off signal so as to make the signals received by the first receiving device 231 and the second receiving device 232 become digital signals. The decoding speed and accuracy of the digital signals mentioned above are much more superior to the analog signals of the prior art. The touching position within the touching area 210 can be defined directly without the conventional complicated analog calculation performed by the signal processor. Therefore, the consuming of the calculating energy and the calculating time of the signal processor are both decreased, and the accuracy and response speed are both increased.

Figure 3:
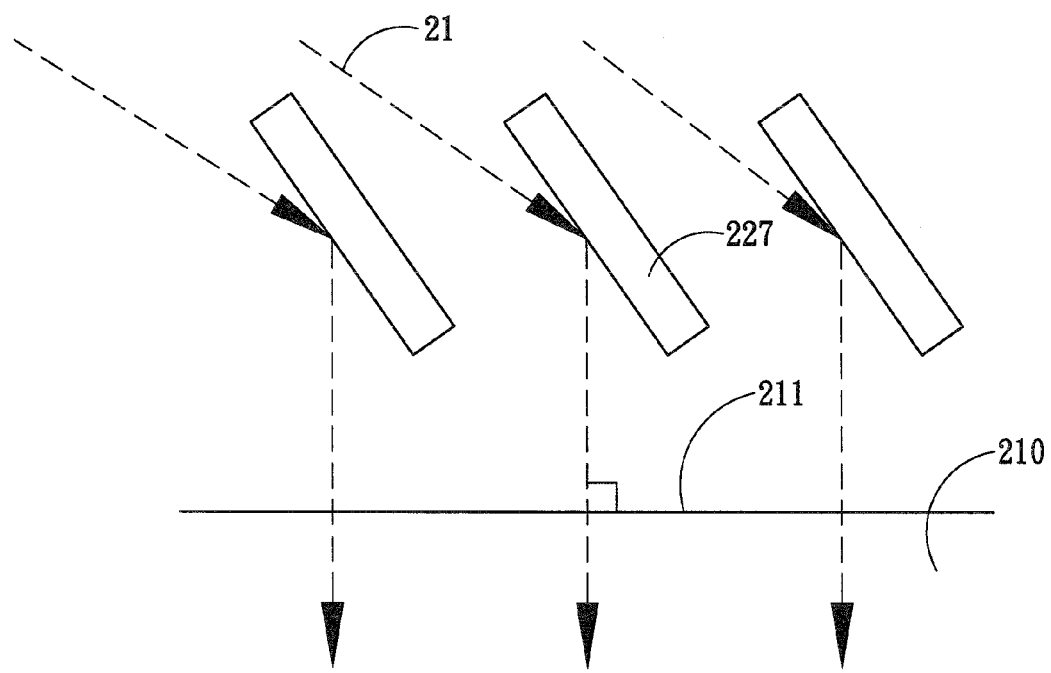
FIG. 3 shows a diagram of the reflective lens array shown in FIG. 1.

FIG. 3 shows a diagram of the reflective lens array shown in FIG. 1. The first reflective lens array 241 is taken as an example, the first reflective lens array 241 includes a plurality of mirror for adjusting the direction of each laser beam 21 so as to make each laser beam 21 be perpendicular to the first edge 211. The laser beams 21 are distributed in a parallel arrangement over the touching area 210 without being interfered by other laser beams 21. For the same reason, the second reflective lens array 242 has the same function to form the parallel laser beams 22. The laser beams 21/22 are distributed in an interlaced arrangement over the touching area 210 by the first reflective lens array 241 and the second reflective lens array 242.

Figure 4:
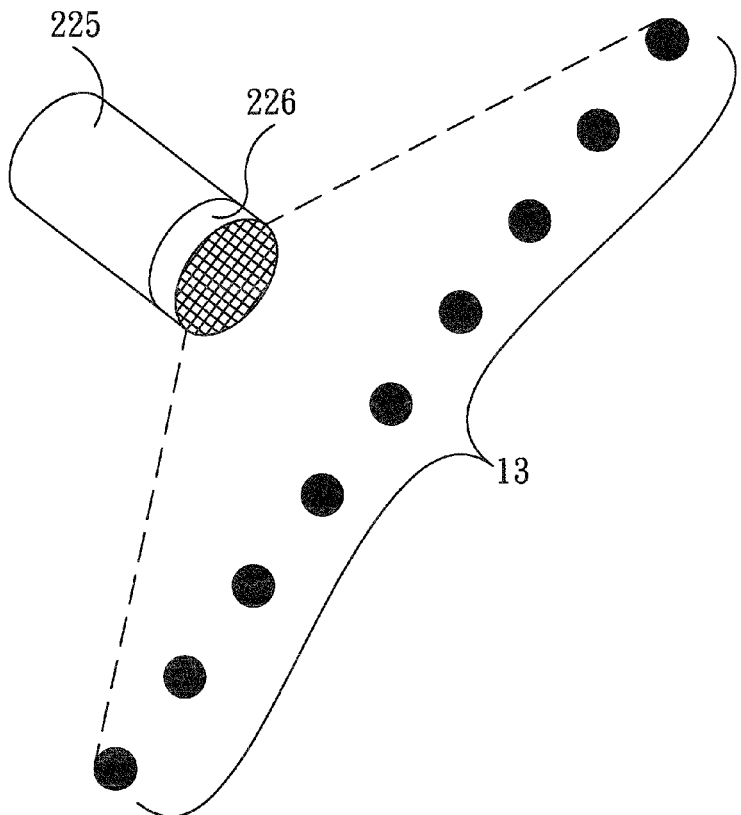
FIG. 4 shows a diagram of the laser source module shown in FIG. 1.

FIG. 4 shows a diagram of the laser source module shown in FIG. 1. The first laser source module 221 and the second laser source module 222 include a laser diode 225 and a diffractive optical element 226 respectively. The diffractive optical element 226 is assembled in front of the laser diode 225, the diffractive optical element 226 is used to separate one laser beam projected by the laser diode 225 to a plurality of laser beams 21/22 with equal magnitude. In other words, these laser beams 21/22 have laser spots 13 with equal dimension and equal energy.

Because the laser diode 225 is an excellent light source with excellent coherent property, these laser beams 21/22 projected by the laser diode 225 are not divergent. As the projecting distance increases, the energy of the laser beams 21/22 does not decrease. Therefore, the problems of the LED light source are prevented. Moreover, the laser diode 225 has smaller volume, lower energy consumption, and longer life. Thus, the laser diode 225 is suitable for the touch device 200.

In this embodiment, the diffractive optical element 226 is a chip lens. According to the demand of the system resolution, the chip lens is capable of separating one laser beam projected by the laser diode 225 to a plurality of laser beams 21/22 with equal dimension and equal energy. The diffractive optical element 226 is not limited to chip lens, the diffractive optical element 226 can be other device which has the same function. Since diffractive optical element 226 is capable of separating one laser beam projected by the laser diode 225 to the plurality of laser beams 21/22, there is no need for increasing the number of the laser diode 225 while the resolution is increased. The cost of the touch device 200 is decreased; the energy consumption problem and the heat dissipating problem are prevented.

Figure 5:
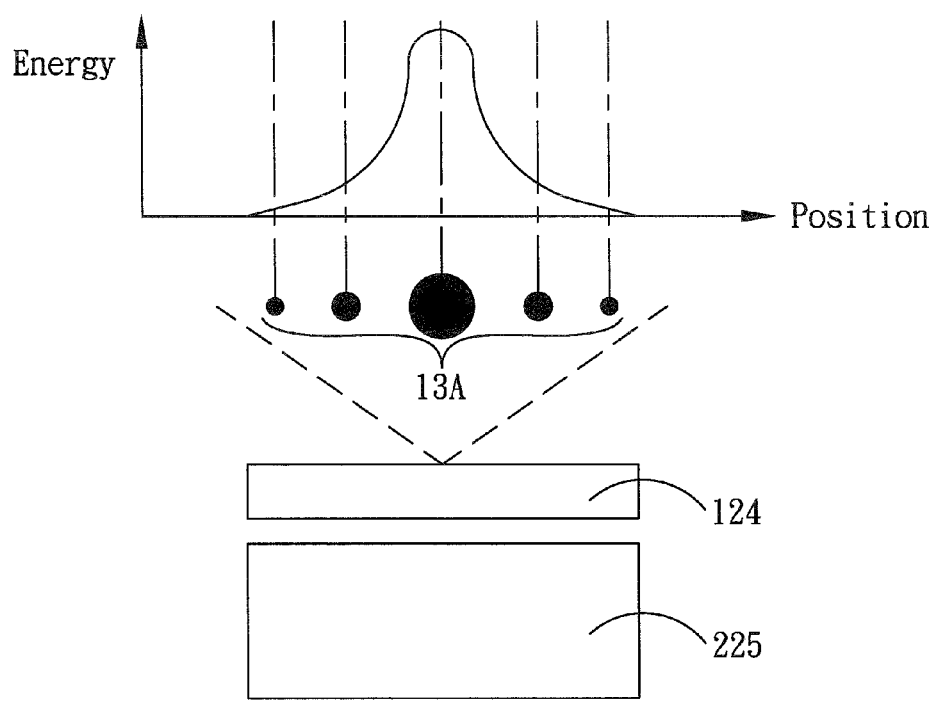
FIGS. 5-7 show diagrams of laser spots formed by different diffractive optical elements.
Figure 6:
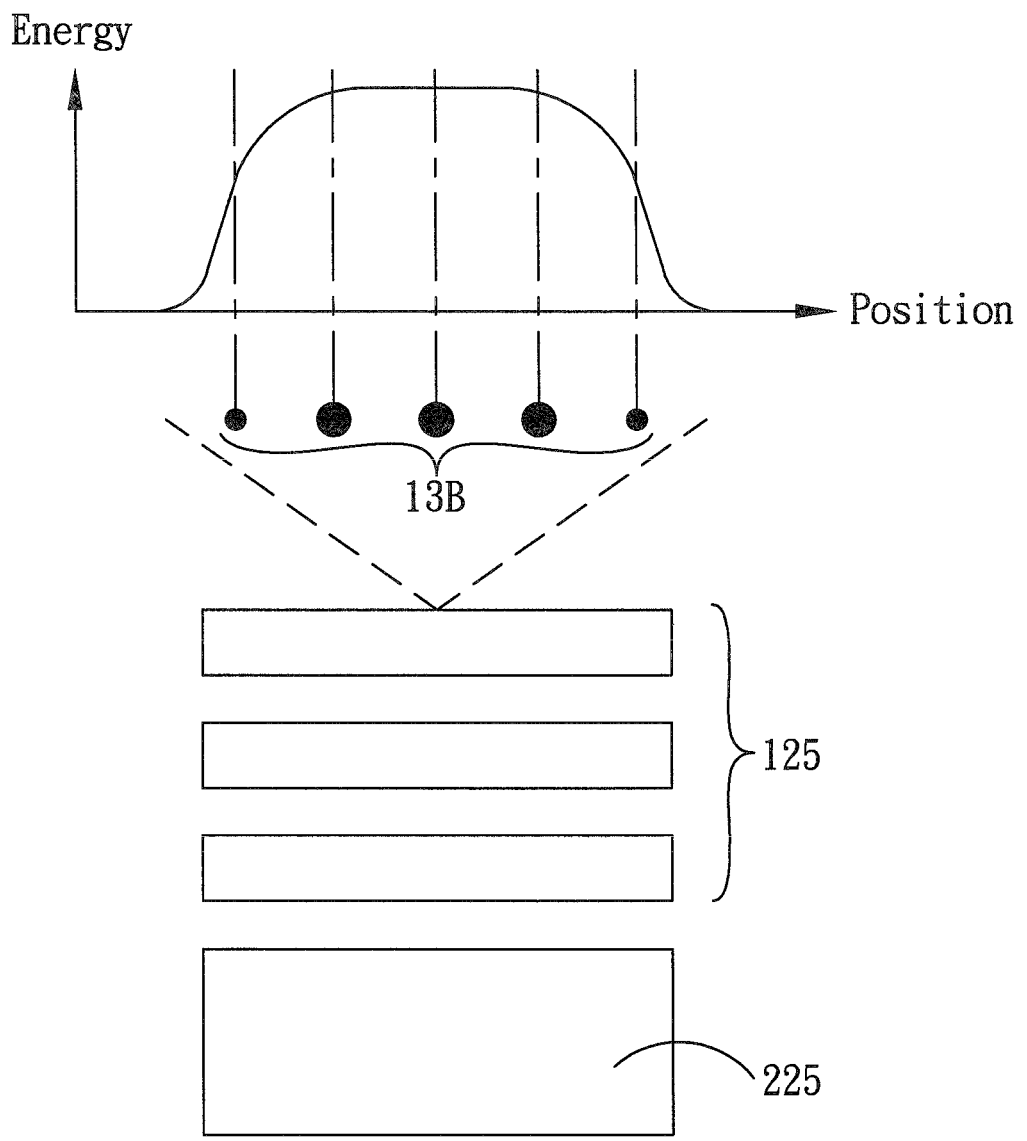
Figure 7:
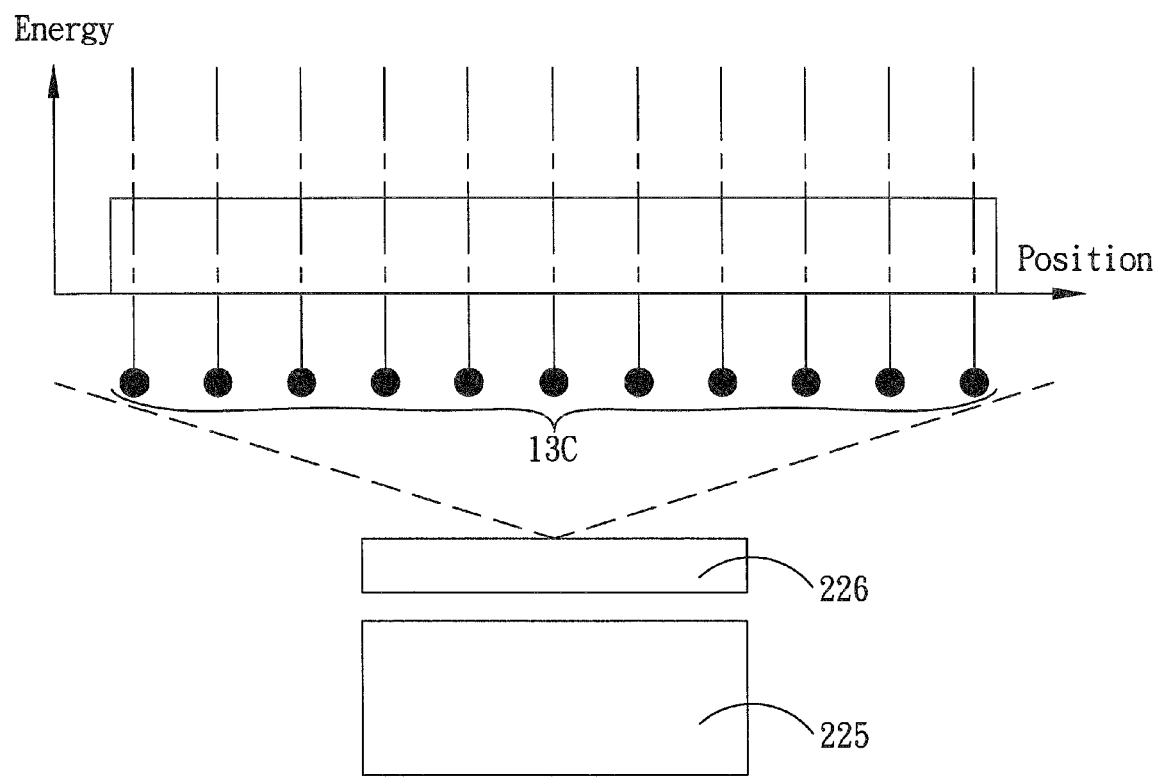

FIGS. 5-7 show diagrams of laser spot formed by different diffractive optical elements. Referring to FIG. 5, a single diffraction lens 124 is disposed in front of the laser diode 225. One laser beam projected by the laser diode 225 is separated to a plurality of laser beams with laser spots 13A. These laser spots 13A do not have equal dimension and equal energy. The laser spots 13A in a central position have larger dimension and larger energy. The laser spots 13A in a boundary position have smaller dimension and smaller energy. Because the energy of the laser spots 13A in the boundary position decreases quickly, it is not possible to make all of the laser spots 13 have equal dimension and equal energy. Moreover, the projecting angle is also limited.

Referring to FIG. 6, a diffraction lens assembly 125 is disposed in front of the laser diode 225, wherein the diffraction lens assembly 125 includes a plurality of diffraction lenses. One laser beam projected by the laser diode 225 is separated to a plurality of laser beams with laser spots 13B. Although the laser beams have been adjusted by the plurality of diffraction lenses, these laser spots 13B do not have equal dimension and equal energy. It is also not possible to make the entire laser spots 13B have equal dimension and equal energy. The calculation involves with the conventional analog signals. Besides, the manufacturing process of the diffraction lens assembly 125 needs a complicated aligning process. The volume and weight of the diffraction lens assembly 125 are large, and the manufacturing cost of diffraction lens assembly 125 is high. The diffraction lens assembly 125 is not suitable for the touch device 200 which is a consumption product.

Referring to FIG. 7, the diffractive optical element 226 is a chip lens. The chip lens is assembled in front of the laser diode 225. One laser beam projected by the laser diode 225 is separated to a plurality of laser beams with laser spots 13C. These laser spots 13C have equal dimension and equal energy. In this embodiment, by the diffractive optical element 226 which is a chip lens, the light projected by the laser diode 225 is separated directly to a plurality of laser spots 13C. For example, the light projected by the laser diode 225 is separated directly to N laser spots; the energy of each laser spot is 1/N of the original energy. Since each laser spot has similar energy, it is easy for the first receiving device 231 and the second receiving device 232 to sense laser spots 13 directly without mistakes.

Besides, in this embodiment, the diffractive optical element 226 which is a chip lens is assembled in front of the laser diode 225. In other words, it is similar to integrate lens assembly into a single lens. The advantages of the diffractive optical element 226 include low cost, volume saving, and simplifying the complicated aligning process of the manufacturing process. Thus, the practicability is much higher.

Figure 8:
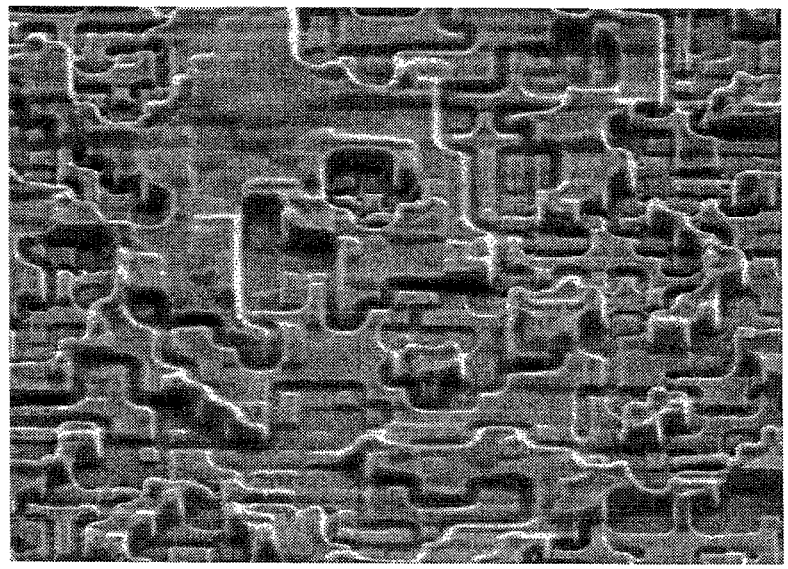
FIGS. 8 and 9 show a diagram of the chip lens and a diagram of the function of the chip lens respectively.
Figure 9:
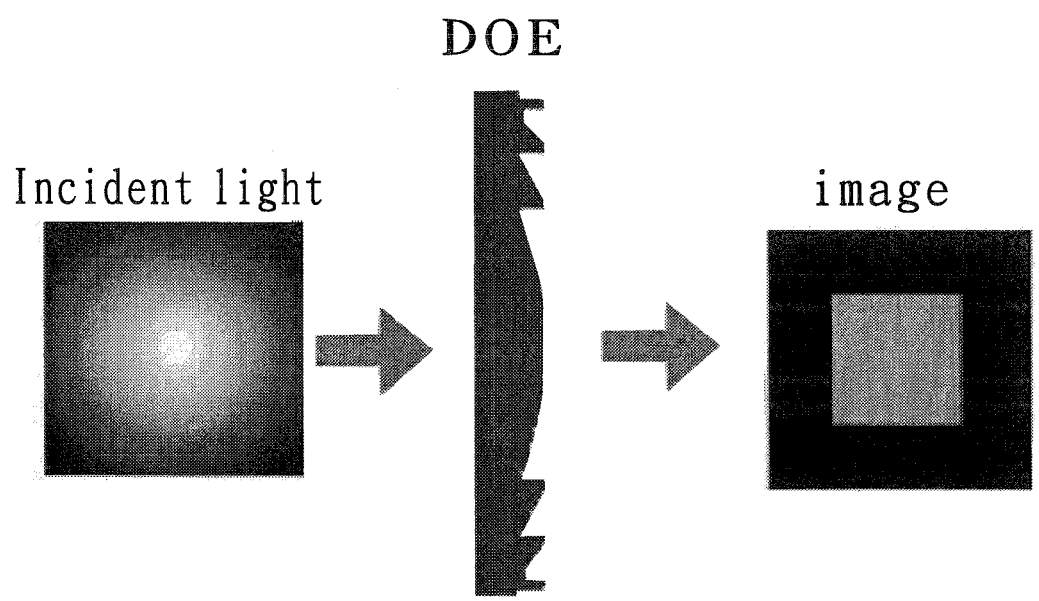

FIG. 8 and FIG. 9 show a diagram of the chip lens and a diagram of the function of the chip lens respectively. The chip lens is a lens which is made by the semiconductor process or the manufacturing process of the microelectric mechanical system. Numbers of convex lenses or concave lenses are formed on the glass by the wet forming method or the dry forming method for transferring the light having unequal energy distribution into the light having equal energy distribution so as to achieve better optical effect. Wherein the dry forming method includes molding process, laser etching and so on; the wet forming method includes chemical etching.

In this embodiment, by the chip lens, a single laser beam is separated to a plurality of laser beams 21/22 with laser spots 13 having equal dimension and equal energy. At the same time, the projecting angles of the laser beams 21/22 are limited to zero. Thus, the signals received by the first receiving device 231 and the second receiving device 232 in different positions are in the same voltage potential. For example, the first sensing units 2311 of the first receiving device 231 will not be interfered by the adjacent laser beams 21. When the laser beam 21 is not blocked, the signal of the sensing unit is defined as "1". When the laser beam 21 is blocked, the first sensing units 2311 of the first receiving device 231 will not receive any light energy; the signal of the sensing unit is defined as "0". Thus, there are only two signals, "1" and "0", which can be received by the first sensing units 2311 of the first receiving device 231 without any other condition. For the same reason, the second sensing units 2322 of the second receiving device 232 will not be interfered by the adjacent laser beams 22. Thus, the resolution of the touch device can be increased greatly. For example, in the same objective condition, the single diffraction lens mentioned above can produce 11 lights in the dimension of 5 inch; the chip lens mentioned above can produce more than 121 lights in the same dimension. Therefore, the resolution of the touch device can be increased greatly.

By the touch device of the present invention, the size and resolution of the touch device are both increased. The touch device is able to output digital signals; the touching position within the touching area can be defined directly without the conventional complicated analog calculation performed by the signal processor. Therefore, the consuming of the calculating energy and the calculating time of the signal processor are both decreased, and the accuracy and response speed are both increased.

Although specific embodiments have been illustrated and described, it will be appreciated by those skilled in the art that various modifications may be made without departing from the scope of the present invention, which is intended to be limited solely by the appended claims.

What is claimed is:

1. A touch device, comprising:
   a touching area, said touching area having a first edge and a second edge, said first edge being adjacent to said second edge;
   two reflective lens arrays, said two reflective lens arrays disposed at said first edge and said second edge respectively;
   two laser source modules, said two laser source modules disposed at said first edge and said second edge respectively, and said two laser source modules being at a preset distance from corresponding said reflective lens arrays respectively, wherein each said laser source module comprises a laser diode and a diffractive optical element assembled in front of said laser diode for separating a laser beam projected from said laser diode to a plurality of laser beams with equal magnitude, said laser beams are distributed in a parallel arrangement over said touching area by said reflective lens array; and
   two receiving devices, said receiving devices disposed at the corresponding edges of said first edge and said second edge respectively, said receiving device comprising a plurality of sensing units, wherein each said sensing unit receives one of said laser beams respectively and outputs one digital signal.

2. The touch device as set forth in claim 1, wherein said diffractive optical element is a chip lens.

3. The touch device as set forth in claim 1, wherein said receiving device is a linear image sensor.

4. The touch device as set forth in claim 1, wherein said laser beams are arranged in a checkerboard arrangement over said touching area.

5. The touch device as set forth in claim 1, wherein said laser diode is located at a center position of said first edge or said second edge.

* * * * *